(12) United States Patent
Rother et al.

(10) Patent No.: US 9,050,549 B2
(45) Date of Patent: Jun. 9, 2015

(54) FILTER ARRANGEMENT, IN PARTICULAR AIR FILTER ARRANGEMENT

(75) Inventors: Thilo Rother, Stuttgart (DE); Matthias Traub, Boeblingen (DE)

(73) Assignee: Mahle International GmbH (DE)

( * ) Notice: Subject to any disclaimer, the term of this patent is extended or adjusted under 35 U.S.C. 154(b) by 133 days.

(21) Appl. No.: 13/704,516

(22) PCT Filed: Jun. 14, 2011

(86) PCT No.: PCT/EP2011/059801
§ 371 (c)(1),
(2), (4) Date: Mar. 4, 2013

(87) PCT Pub. No.: WO2011/157687
PCT Pub. Date: Dec. 22, 2011

(65) Prior Publication Data
US 2013/0152527 A1 Jun. 20, 2013

(30) Foreign Application Priority Data

Jun. 16, 2010 (DE) .......................... 10 2010 023 972
Sep. 29, 2010 (DE) .......................... 10 2010 041 657

(51) Int. Cl.
*B01D 45/00* (2006.01)
*B01D 46/00* (2006.01)
(Continued)

(52) U.S. Cl.
CPC ........ *B01D 46/0005* (2013.01); *B01D 46/0006* (2013.01); *B01D 46/103* (2013.01);
(Continued)

(58) Field of Classification Search
CPC .. B01D 46/05; B01D 46/103; B01D 46/2451; B01D 46/2466; B01D 46/4236
USPC .......... 55/378, 523, 529, 478–480, 490, 512; 210/167.01, 167.02, 435, 437, 440, 210/443, 445, 450, 493.1
See application file for complete search history.

(56) References Cited

U.S. PATENT DOCUMENTS 4,640,698 A 2/1987 Ohishi et al.
5,914,413 A * 6/1999 Andersson et al. ............. 55/378
(Continued)

FOREIGN PATENT DOCUMENTS

CN 101554553 A 10/2009
CN 101678264 A 3/2010
(Continued)

OTHER PUBLICATIONS

English Abstact for DE-102007024287-A1.
(Continued)

*Primary Examiner* — Jason M Greene
*Assistant Examiner* — Karla Hawkins
(74) *Attorney, Agent, or Firm* — Fishman Stewart Yamaguchi PLLC

(57) ABSTRACT

A filter arrangement may include a housing having two front walls substantially extended on both sides of a housing center plane and a circumferential wall connecting the front walls. The housing may include an untreated space inlet and a clean space outlet. A filter insert may be arranged between the inlet and the outlet and include two bottom discs that are adjacent to the side walls in the assembled state of the filter insert. The filter insert may include a filter wall extending between and connecting the bottom discs. The filter wall may extend substantially orthogonal to the housing center plane. A lateral disc may define an opening configured to be tightly connected to at least one of the inlet and the outlet. The front walls may be coupled to the bottom discs in the assembled state of the filter insert through interacting profile parts arranged on at least one of the front walls and the bottom discs into a double wall.

20 Claims, 10 Drawing Sheets

(51) Int. Cl.
    *B01D 46/10* (2006.01)
    *B01D 46/42* (2006.01)
    *B01D 46/52* (2006.01)

(52) U.S. Cl.
    CPC .......... *B01D46/4236* (2013.01); *B01D 46/521* (2013.01); *B01D 2265/024* (2013.01); *B01D 2275/206* (2013.01)

(56) References Cited

U.S. PATENT DOCUMENTS

| | | | |
|---|---|---|---|
| 6,508,851 | B2 | 1/2003 | Goerg |
| 6,814,660 | B1 | 11/2004 | Cavett |
| 2010/0132323 | A1* | 6/2010 | Sulzberger et al. .............. 55/523 |

FOREIGN PATENT DOCUMENTS

| | | |
|---|---|---|
| DE | 19856520 A1 | 6/2000 |
| DE | 10328002 A1 | 1/2005 |
| DE | 102004054274 A1 | 5/2006 |
| DE | 102007024287 A1 | 11/2008 |
| DE | 10328002 B4 | 2/2010 |
| EP | 0068662 A1 | 1/1983 |
| FR | 2935102 A1 | 2/2010 |
| JP | 57-18451 | 1/1982 |
| JP | 59-119055 | 7/1984 |
| JP | 61-275562 A | 12/1986 |
| JP | 06-31060 A | 4/1994 |
| JP | 2008518842 A | 6/2008 |
| WO | WO-2006009766 A1 | 1/2006 |

OTHER PUBLICATIONS

English Abstract for JP-61-275562-A.
English Abstract for JP-59-119055.
English abstract for DE-10328002.
English abstract for FR-2935102.
First Office Action in Chinese, Chinese Pat. App. No. 201180020466.9. (English translation not available).
English Abstract for CN101678264A.
English Abstract for JP2008518842A.
English Abstract for CN101554553A.

* cited by examiner

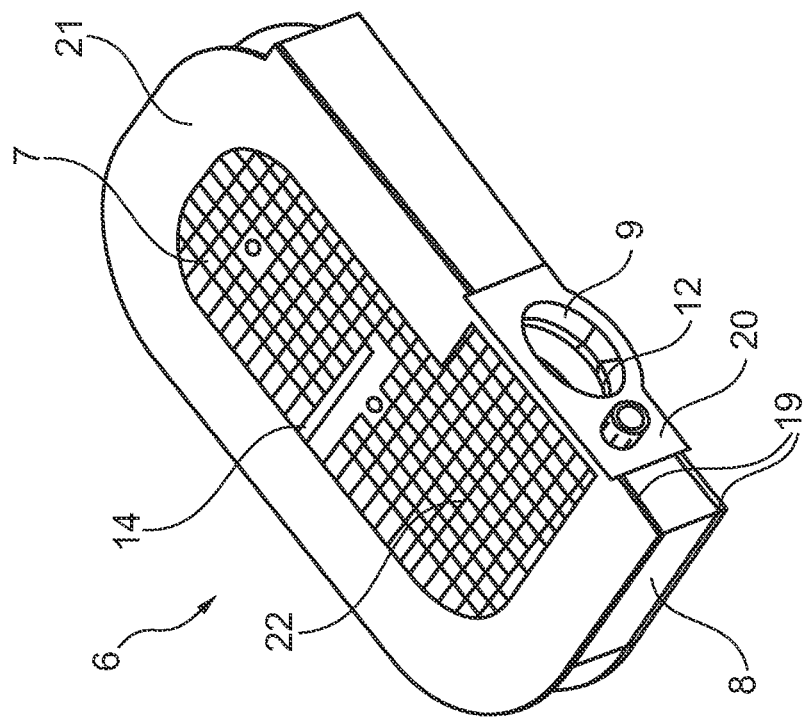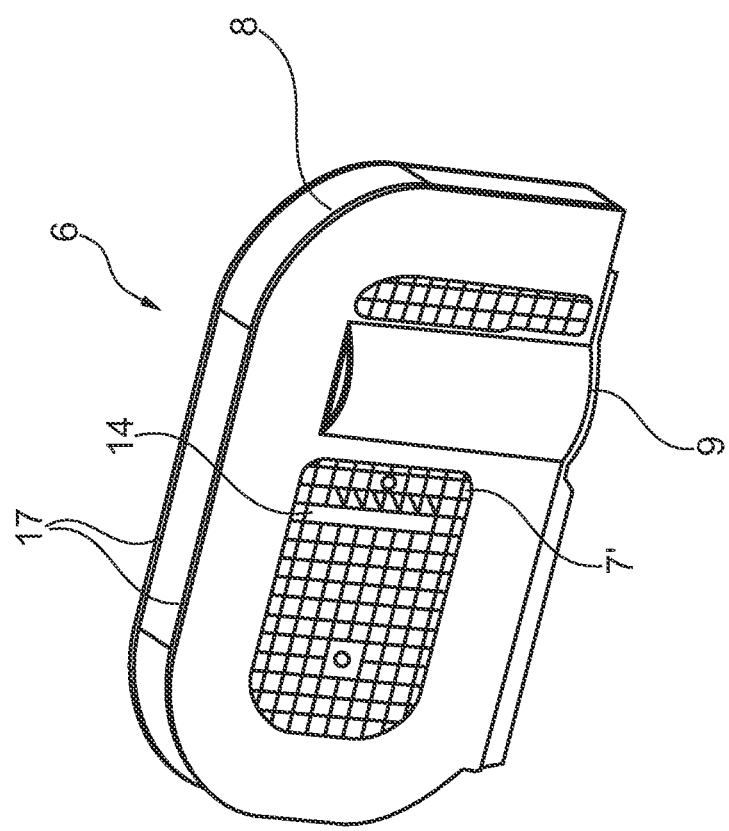
Fig. 3

FILTER ARRANGEMENT, IN PARTICULAR AIR FILTER ARRANGEMENT

CROSS-REFERENCE TO RELATED APPLICATIONS

This application claims priority to German Patent Application 10 2010 023 972.0 filed on Jun. 16, 2010, German Patent Application 10 2010 041 657.6 filed on Sep. 29, 2010, and International Patent Application PCT/EP2011/059801, all of which are hereby incorporated by reference in their entirety.

TECHNICAL FIELD

The invention relates to a filter arrangement, in particular an air filter arrangement having a housing which comprises two large side walls substantially extending on both sides of a housing center plane and a circumferential wall that is substantially orthogonal to the housing center plane connecting the side walls and a untreated space inlet and a clean space outlet, and having a filter insert that is active between the untreated space inlet and the clean space outlet, which comprises two bottom discs which in the assembled state of the filter insert are adjacent to the side walls and a filter wall connecting the marginal zones of said bottom discs which are substantially orthogonal to the housing center plane, which filter wall is penetrated by an opening that can be tightly connected to the untreated space inlet or the clean space outlet.

BACKGROUND

Such air filter arrangements are employed for large diesel engines of commercial vehicles as standard. Here, the housing can have a case-like shape, wherein it is advantageous that an adaptation to existing free spaces on commercial vehicles is easily possible in principle since the size of the front walls and their spacing from one another can be adapted to the respective conditions.

As a rule, the opening of the filter insert penetrating the filter wall is tightly connected to the clean space outlet so that the interior space of the filter insert forms the clean space. The spacing room outside the filter insert in the housing that is enlarged relative to the volume of the filter insert then forms the untreated space.

In principle, an obverse configuration is also conceivable wherein the interior space of the filter insert forms the untreated space and the interior region of the housing surrounding the filter inserts forms the clean space.

With all motor vehicles and/or all engines, a low noise development is extremely desirable. In the case of combustion engines, this applies in particular also to the air inlet side. With filter arrangements of the type stated at the outset there is the fundamental problem that the comparatively large front walls of the housing can be excited into vibrations.

SUMMARY

It is therefore the object of the invention with such a filter arrangement of the type stated at the outset to create a design with which noises and in particular resonance vibrations can be largely eliminated.

According to the invention, this object is solved in that the side walls of the housing are coupled to the bottom discs of the filter insert, in particular through web or profile parts arrangement on or molded onto the side walls or the bottom discs.

The invention is based on the general idea of combining the side walls of the housing and the bottom discs of the filter insert each into a double wall so that in each case a side wall of the housing and the adjacent bottom disc of the filter insert mutually stiffen each other. Here it is advantageous that with possible bending deformations of the double wall, i.e. of housing side wall and bottom disc of the filter insert, shearing movements involving friction occur between the respective side wall and bottom disc so that an effective vibration damping takes place.

Otherwise, the invention also offers the advantage that profile parts interacting with one another can additionally assume the functions of a guidance when replacing the filter insert for coupling the side walls and the bottom discs so that the respective contaminated filter insert can be optimally moved out of the housing and the respective new filter insert exactly brought into the desired position.

In this connection it can be practically provided that the housing is divisible with respect to a parting plane that is orthogonal to the housing center plane and the axis of the untreated space inlet that can be tightly connected to the opening of the filter insert or clean space outlet is aligned perpendicularly to the parting plane. Thus, the filter insert can be removed from the housing or inserted in the housing subject to carrying out a largely linear translatoric movement.

According to a further highly advantageous embodiment of the invention, it can be provided that the bottom discs of the filter insert are connected to one another within the space enclosed by the filter wall through pillar-like protrusions or the like which can be designed in the manner of plug connections, in a stiff, in particular pressure and tension-resistant manner.

Otherwise, reference with respect to preferred features of the invention is made to the claims and the following explanation of the drawing, by means of which a particularly preferred embodiment of the invention is explained in more detail.

Protection is not only claimed for stated or represented feature combinations, but also for principally any combinations of the stated or represented individual features.

DETAILED DESCRIPTION

Figure 1:
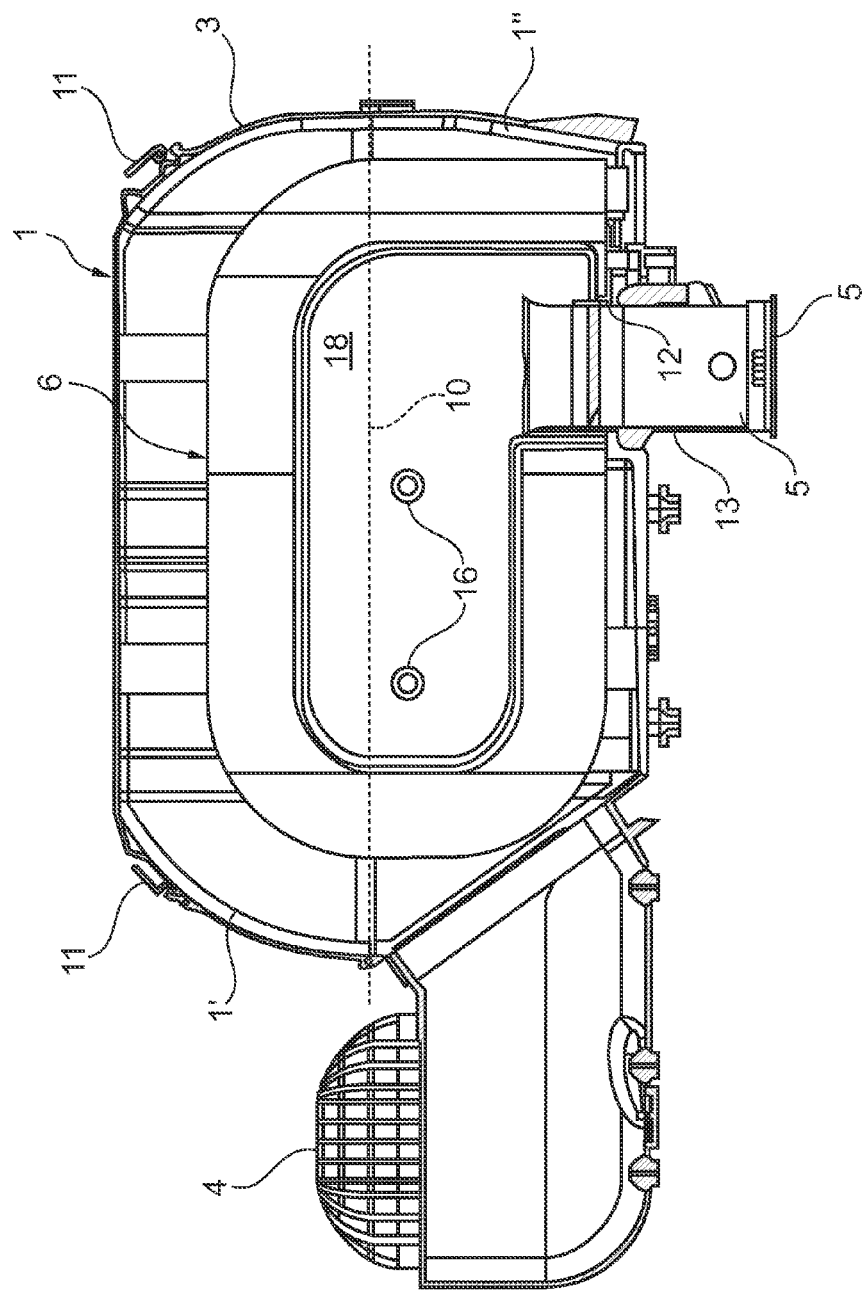
FIG. 1 sectional image of an air filter arrangement according to the invention, wherein the sectional plane falls into a housing center plane, FIG. 2 partially sectioned representation of the air filter arrangement according to the invention, FIG. 3 perspective representation of the filter insert, FIG. 4 sectioned perspective representation of the filter insert, wherein the section plane coincides with a parting plane of the filter housing, FIG. 5 sectional image of housing and filter insert, wherein the sectional plane coincides with the parting plane of the housing, FIG. 6 various embodiments of the filter insert, FIG. 7 perspective representation of the filter insert of a modified embodiment, wherein the profiles provided on the bottom discs are additionally shown in an enlarged detail representation, FIG. 8 sectional image corresponding to a sectional plane that is perpendicular to the lateral surfaces and to the parting plane of the housing, FIG. 9 perspective representation of a filter insert that is modified once again and FIG. 10 sectional image of this filter insert in the housing.
Figure 2:
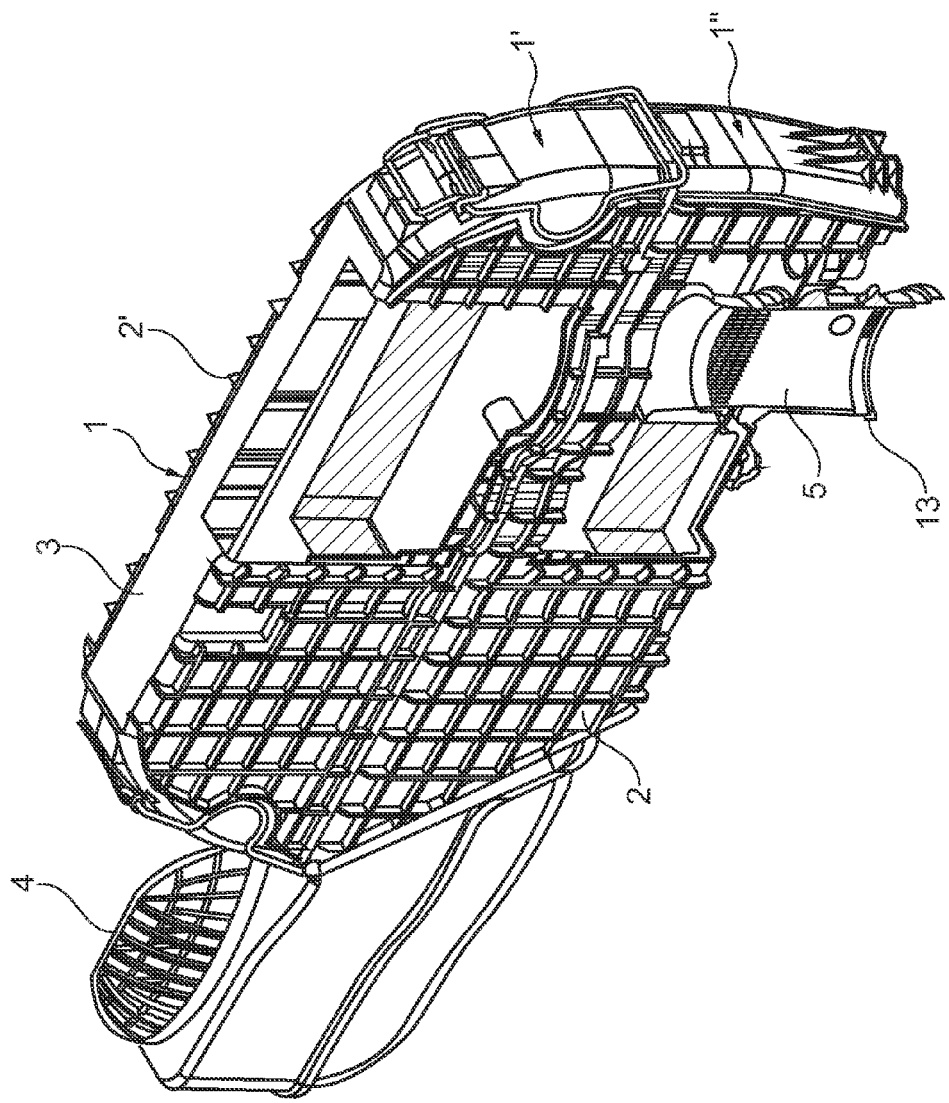
Figure 4:
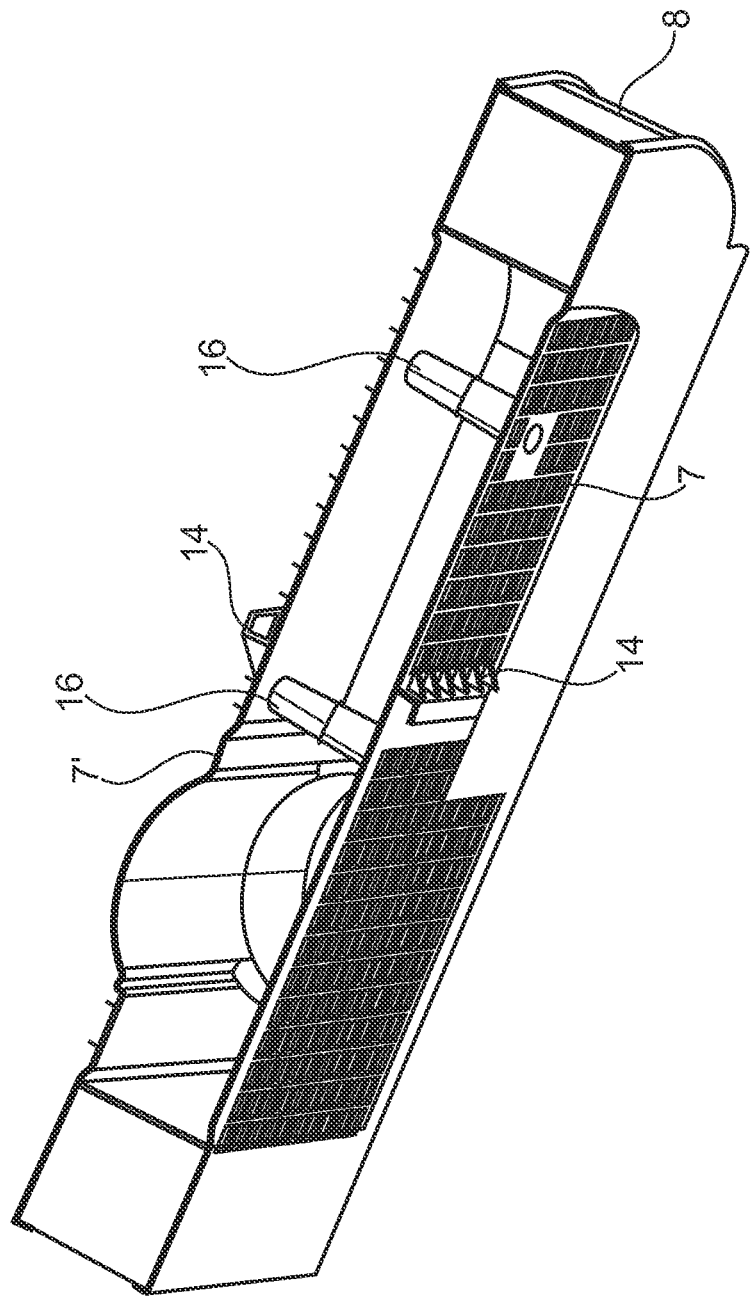

According to FIGS. 1 and 2, the air filter arrangement according to the invention comprises a housing 1 with comparatively large lateral surfaces 2 and 2', which are connected to each other through a comparatively narrow circumferential wall 3. On the circumferential wall 3, an untreated space inlet 4 and a clean space outlet 5 are arranged, wherein inlet 4 and outlet 5 are separated through a filter insert 6 arranged in the housing 1.

According to FIG. 3, the filter insert 6 comprises front bottom discs 7 and 7', which on their marginal zones are connected to one another through an almost circumferential filter wall 8, which in top view of the bottom discs 7, 7' can be pleated approximately star-like, wherein the pleat folds extend perpendicularly to the bottom discs 7, 7'. This filter wall 8 is penetrated on a long side 19 of the bottom discs 7 and 7' by an opening 9, which is arranged in a lateral disc 20 tightly connected to the filter wall 8 and the bottom discs 7, 7'. In the assembled state of the filter insert 6, the lateral disc 20 is tightly connected to the clean space outlet 5 of the housing 1. During operation, non-cleaned air thus flows through the untreated space inlet 4 into the housing 1, subsequently flows through the filter wall 8 and thus enters the interior space 18 of the filter insert 6 forming the clean space, wherein contaminations are held back by the filter wall 8. Accordingly, cleaned air then exists from the clean space outlet 5.

On a parting plane 10 that is substantially orthogonal to the lateral surfaces 2 and 2' or to a housing center plane between the lateral surfaces 2 and 2' the housing 1 is divisible, wherein a in FIG. 2 upper housing part 1' is connected in a fixed manner to the in FIG. 2 lower housing part 1" via toggle lever-like clamping levers 11.

When the housing 1 is opened, i.e. when the upper housing part 1' after opening of the clamping levers 11 has been removed from the lower housing part 1", the filter insert 6 can be pulled out from the lower housing part or pushed in a sealing manner into the lower housing part in the manner of a drawer, wherein a seal 12 on the inner margin of the opening 9 of the filter insert 6 is pushed onto the outer circumference of a pipe connector 13 in the interior space of the lower housing part 1" forming the clean space outlet 5 or separated from this pipe connector 13.

In the assembled state of the filter insert 6, its bottom discs 7 and 7' have a position adjacent to the insides of the end faces 2 and 2' of the housing 1 that is substantially parallel.

It is provided that the bottom discs 7 and 7' of the filter insert 6 according to a first embodiment of the invention are connected to the insides of the lateral surfaces 2 and 2' of the housing 1 in a form-fitting manner. This purpose is served by inter-engaging angular profiles 14 and 15 which are arranged on the outsides of the bottom discs 7 and 7' or on the insides of the lateral surfaces 2 and 2', which are aligned so that they also serve as sliding guides during the sliding-in of the filter insert 6 into the housing 1 or during the pulling-out of the filter insert 6 from the housing 1.

Figure 5:
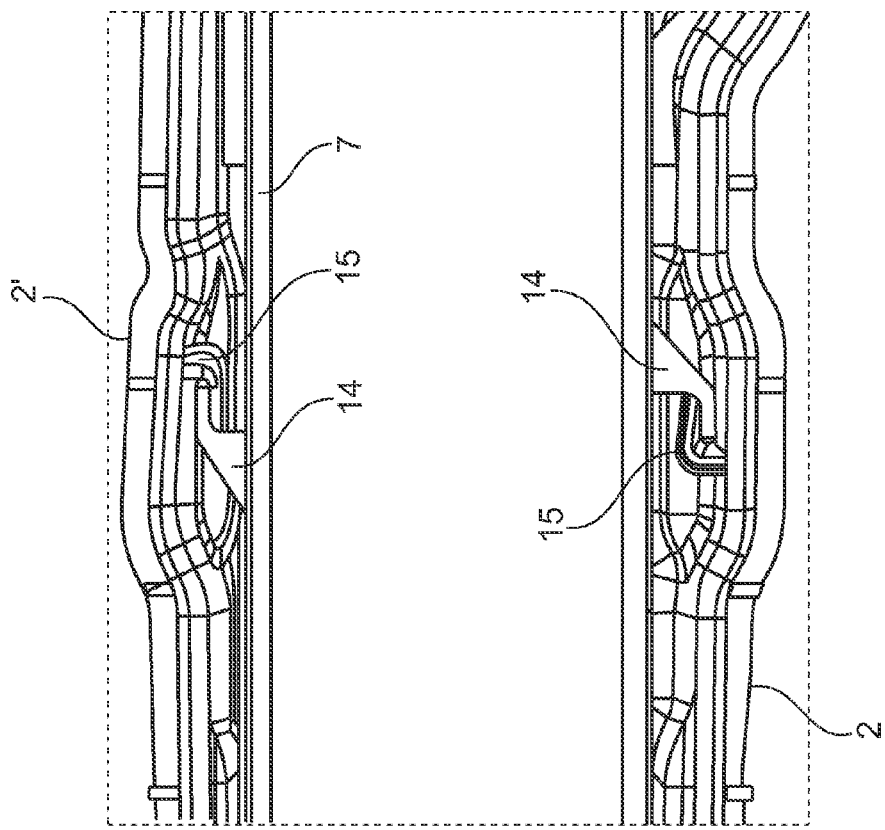

As is evident in particular from FIG. 5, the angular profiles 14 are formed opposite on the side of the bottom disc 7 and 7' facing away from each other, i.e. the free margin of the in FIG. 5 upper angular profile 14 faces to the right, while the free margin of the in FIG. 5 lower angular profile 14 is directed to the left. The free margins of the angular profiles 15 on the housing side are correspondingly aligned conversely. The angular profiles 14 arranged on the filter insert 6 penetrate the parting plane 10 of the housing in the assembled state of the filter insert 6, so that they interact both with angular profiles 14 on the housing side on the lower housing part 1" as well as on the upper housing part 1.

The bottom discs 7 and 7' comprise a marginal region 21 and a center region 22. In the marginal region 21, the bottom discs 7, 7' are embodied flat. This is particularly advantageous when the bottom discs 7, 7' are plasticized with the filter wall 8 for the sealing connection. Thus, a uniform heat input without interference contours can take place. The center region 22 can be embodied ribbed for stiffening the bottom disc 7, 7'. It is additionally advantageous if the angular profiles 14 are arranged in the center region 22. Thus, the bottom disc 7, 7' in this region, in which the bottom disc 7, 7' because of the size has the least intrinsic stiffness, can be connected to the housing 1. With the shown filter insert 6, each bottom disc 7, 7' comprises a centrally arranged angular profile 14. With other embodiments, two or more angular profiles 14 for each bottom disc can also be provided. These can be arranged aligned with one another, in series or offset to one another. Here, each angular profile 14 is assigned a mating angular profile 15 on the housing 6. Alternatively, however, a plurality of angular profiles 14 can also be provided, wherein only a part quantity of the angular profiles 14 corresponds to an angular profile 15 of the housing 6.

With the shown embodiment, in particular according to FIG. 3, an angular profile 14 is provided which corresponds to the lower housing part 1" and to the upper housing part 1'. Thus, the housing parts 1', 1" are centered to one another through the filter insert 6 in addition to other geometrical configurations.

According to other exemplary embodiments which are not shown, other, in particular point-like guiding elements such as for example mushroom heads can also be provided alternatively to the angular profiles 14, which are received in point-like or continuous guide mountings in the housing 6.

In the result, the side walls 2 and 2' of the housing 1 like the bottom discs 7 and 7' of the filter insert 6 interact subject to mutual stiffening and subject to forming a double-walled composite that can be engine and pressure-loaded.

This effect is additionally reinforced in that between the bottom discs 7 and 7' within the space enclosed by the filter wall 8, pillar-like connecting bodies 16 are provided. Here, a half of a connecting body 16 each can be molded onto the one bottom disc 7 and the other half of the respective connecting body 16 to the other bottom disc 7' and form a non-releasable plug connection with the respective other half in such a manner that the bottom discs 7 and 7' are connected via the connecting bodies 16 capable of being tension and pressure loaded. With other configurations, the connecting body can also be completely arranged on a bottom disc 7 or 7' and support itself on the bottom disc 7' and 7 arranged opposite. To this end, a mounting is preferentially arranged on this opposite bottom disc in which the connecting body 16 engages.

The margins 17 (see FIG. 3) on the sides of the bottom discs 7 and 7' facing away from the opening 9 can likewise interact with stop surfaces, which are arranged on the insides of the end faces 2 and 2' on the upper housing part 1'. The stop surfaces can for example be formed as steps or other geometrical constrictions of the interior space of the housing 1. Thus, the filter insert 6 is automatically forced into its desired end position when the upper housing part 1' is started on the lower housing part 1" and the clamping levers 11 are closed.

Otherwise, beads or the like can be arranged (not shown) in the lateral surfaces 2 and 2' of the housing 1 in such a manner that on the inside of the mentioned lateral surfaces protrusions are formed which interact with depressions on the bottom discs 7 and 7' of the filter insert 6 engagement-like. Thus, a particularly strong retention of the filter insert 6 in the housing 1 can be ensured.

In principle, the housing 1 and the filter insert 6 can have different shapes adapted to one another. Substantially it need only be ensured that in the assembled state of the filter arrangement a spacing room remains between the inside of the circumferential wall 3 of the housing and the filter wall 8 of the filter insert 6, via which the preferably all zones of the filter wall 8 communicate with the untreated space inlet 4.

Figure 6:
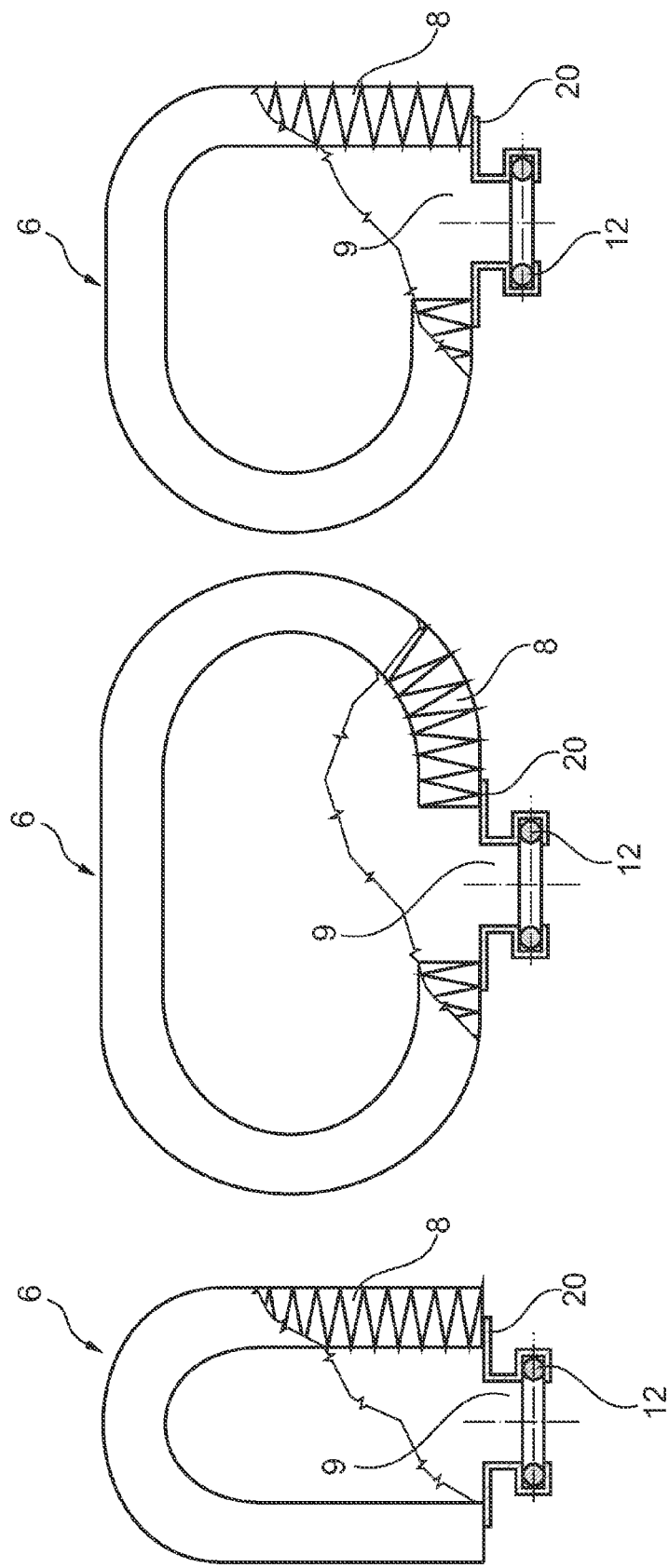

FIG. 6 shows schematically different shapes of the filter insert 6, wherein the housing 1 is then molded in a suitably adapted manner. Otherwise FIG. 6 exemplary shows that the filter wall 8, for enlarging the filter area, can substantially consist of a pleated strip of filter material, in particular of cellulose-containing filter paper or a polymer filter fleece, which is annularly closed via the lateral disc 20 tightly connected to the filter material strip. Here, any outer geometries of the filter insert 6, such as for example round, oval, polygonal, kidney-shaped can be realized, wherein through the filter material and the bottom discs an inner volume is formed. The inner volume is thus available for the passage of air to be cleaned. In the representation of FIG. 6, the marginal zones of the bottom discs 7 and 7' connected through the pleated filter material exemplarily have a U-shape or C-shape or G-shape (when viewed from the left to the right).

In order to facilitate the sliding-in of the filter insert 6 into the lower housing part 1" or the sliding-on of the upper housing part 1' onto the filter insert 6 pushed into the lower housing part 1", insertion bevels can be arranged on the long ends of the profiles 14 of the filter insert and/or on the long sides of the housing-sided profiles 15 adjacent to the parting plane 10.

Figure 7:
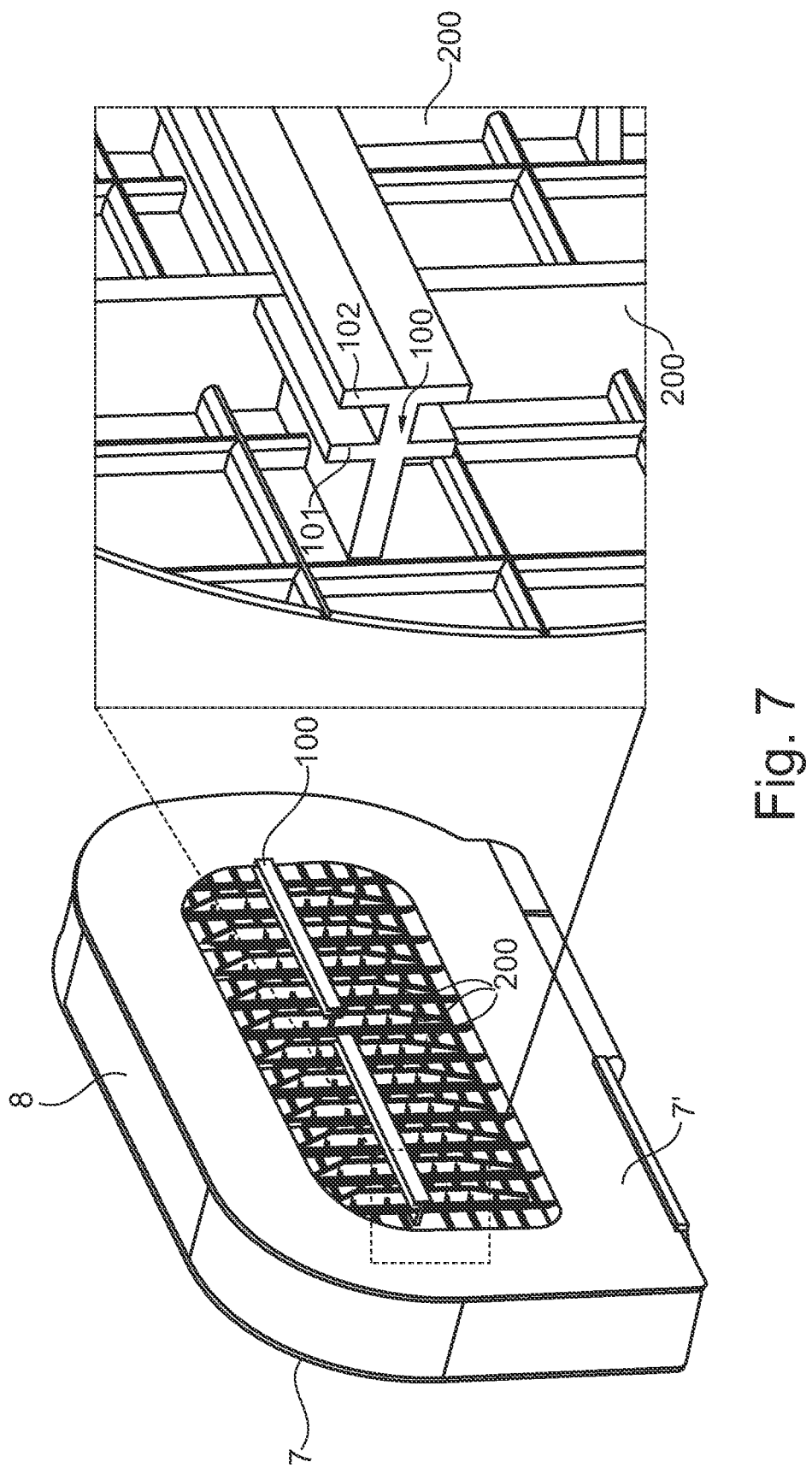

With the embodiment shown in FIG. 7 it is also provided that the bottom discs 7 and 7' of the filter insert 6 are connected to the insides of the lateral surfaces 2 and 2' of the housing 1 in a form-fitting manner. This purpose is served by profiles arranged on the outsides of the bottom discs 7 and 7', which interact with fitting mating profiles on the margins of the lateral surfaces 2 and 2' of the housing 1 on the parting plane side.

Figure 8:
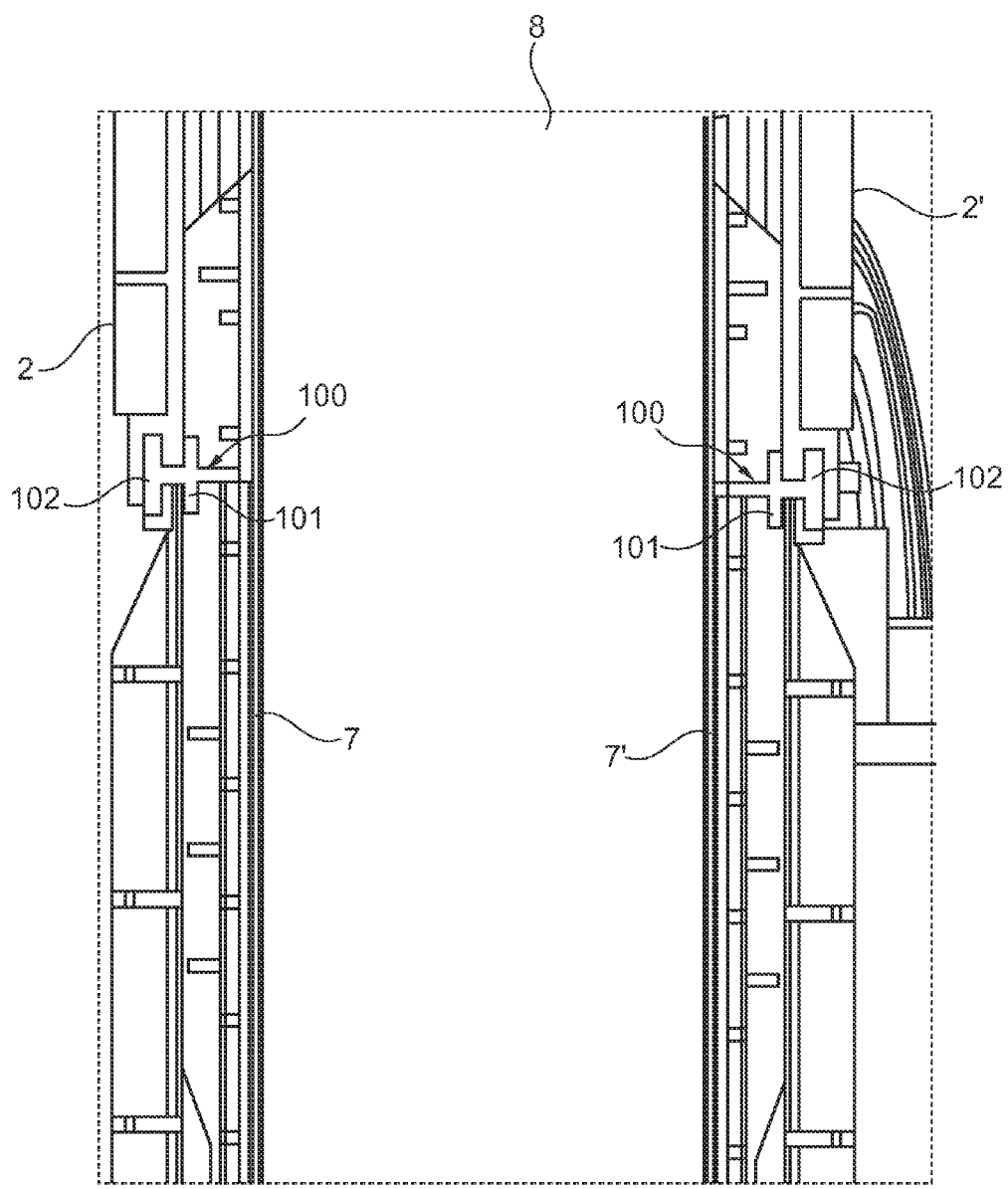

On the zones of the bottom discs 7 and 7' of the filter insert 6 penetrated by the parting plane 10 in the assembled state of the filter arrangement, outside profile strips 100 are provided, which according to FIG. 8 are designed as double T-profiles. On the margins of the lateral surface parts of the housing parts 1' and 1" on the parting level side, mating profiles fitting thereto are provided. On the lateral surface of the upper housing part 1', a non-symmetrical U-profile is provided, which with a relatively short leg protrudes between the flanges 101 and 102 of the double D-profile of the profile strip 100 and with a comparatively long U-leg covers the side of the flange 102 facing away from the bottom disc 7 and 7'. On the margin of the lateral surface part of the lower housing part 1" on the parting plane side an angular profile is provided, which, with a leg extended in the plane of the lateral surface protrudes between the flanges 101 and 102 of the profile strip 100 and with a leg that is orthogonal thereto, covers the margin of the flange 102 facing downwards in the drawing.

In this manner, in the assembled state of the air filter arrangement, the flange 102 of the profile strip 100 is completely enclosed by profile parts on the margins on the lateral surface parts of the housing parts 1' and 1" on the parting plane side.

In addition to this, outside on the bottom discs 7 and 7', ribs or webs 200 that are perpendicularly to the profile strip 100 can be arranged, which on the one hand stiffen the bottom discs 7 and 7' above and below the profile strips 100 and on the other hand during the assembly of the housing 1 serve as inside guides for the parts of the lateral surfaces 2 and 2' arranged on the upper or lower housing part 1' and 1", wherein in the assembled state of the filter arrangement, these webs or ribs 103 also bring about a supporting or stiffening of the lateral surfaces 2 and 2'.

Otherwise, the bottom discs 7 and 7' can be additionally stiffened through webs arranged lattice-like on their outsides. Similar webs can also be provided on the outsides of the lateral surfaces 2 and 2' of the housing 1.

Figure 9:
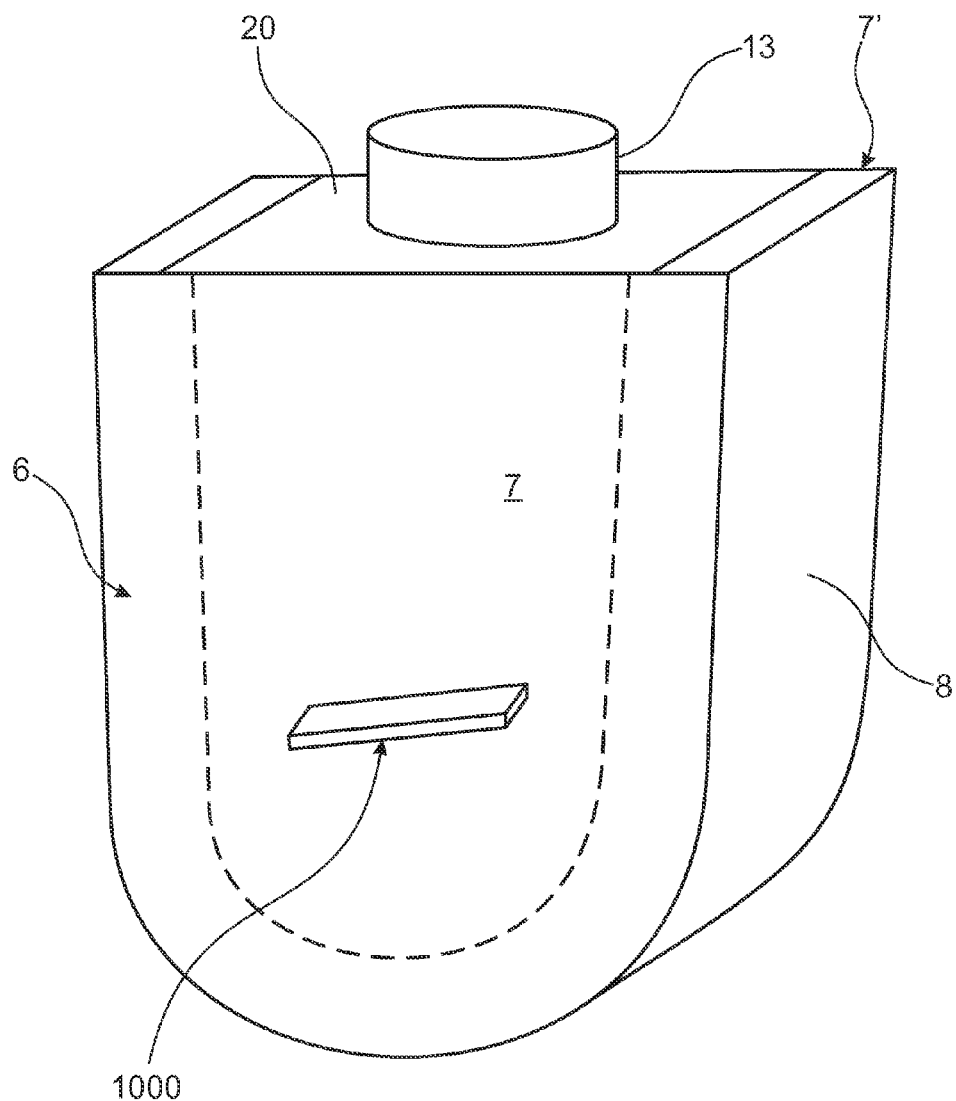

With the embodiment of FIG. 9, webs 1,000 are arranged on the bottom discs 7, 7' of the shown filter insert 6.

Figure 10:
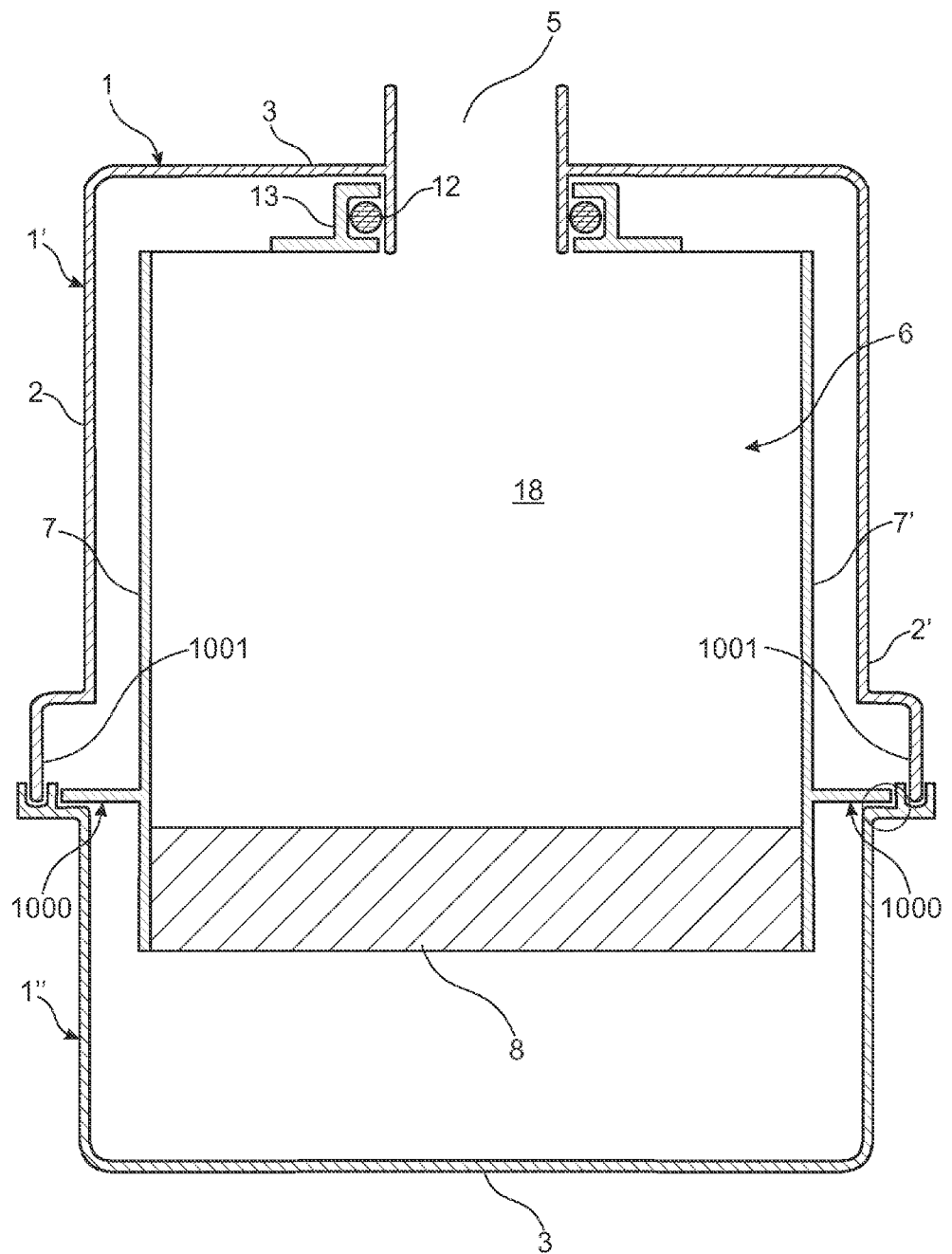

According to FIG. 10, these webs 1,000 in the assembled state of the filter arrangement protrude between the housing parts 1', 1" in the region of the parting plane into a channel 1,001 formed by the margins of the lateral surfaces 2, 2' on the parting plane side, wherein the webs 1,000 on the one hand can rest with pressure on the margin of the lower housing part 1" on the parting plane side and on the other hand with their free longitudinal margins bear against the inside of the connecting zone of the housing parts 1', 1", thus supporting the side walls 2, 2' inwardly.

When the housing parts 1', 1" are separated from each other, the webs 1,000 can be used as gripping strips in order to pull or push the filter insert 6 out of or into the in the drawing upper housing part 1'.

From FIG. 10 it is additionally evident that the position of the filter insert 6 pushed into the upper housing part 1' on the clean space outlet 5 is bounded by the stop of the pipe connector 13 comprising the clean space outlet on the inside of the circumferential wall 3 of the housing 1.

The filter insert of FIGS. 10 and 11 largely corresponds to the left image in FIG. 6.

The invention claimed is:

1. A filter arrangement, comprising:
    a housing having two side walls substantially extended on both sides of a housing center plane and a circumferential wall substantially orthogonal and connecting the side walls, the housing including an untreated space inlet and a clean space outlet;
    a filter insert arranged between the untreated space inlet and the clean space outlet including two bottom discs arranged adjacent to the side walls in the assembled state of the filter insert, the filter insert including an orthogonal filter wall extending between and connecting the bottom discs, the orthogonal filter wall extending substantially orthogonal to the housing center plane and configured to pass a flow radially through the filter insert from the inlet of the housing to the outlet of the housing; and
    a lateral disc defining an opening configured to be tightly connected to at least one of the untreated space inlet and the clean space outlet;
    wherein the side walls are coupled with the bottom discs in the assembled state of the filter insert through interacting profile parts arranged on at least one of the side walls and the bottom discs into a double wall;
    wherein the bottom discs of the filter insert are sealingly connected to the side walls in a form-fitting manner.

2. The filter arrangement according to claim 1, wherein the housing is divisible with respect to a parting plane that is substantially orthogonal to the housing center plane and in an axis of at least one of the untreated space inlet and clean space outlet, wherein the opening of the filter insert is aligned perpendicularly to the parting plane.

3. The filter arrangement according to claim 1, further comprising pillar-like connections arranged between the bottom discs and configured to transmit at least one of tension and pressure forces.

4. The filter arrangement according to claim 1, wherein the profile parts are designed as guide rails together interacting with one another, which extend parallel to the axis of at least one of the untreated space inlet and clean space outlet.

5. The filter arrangement according to claim 4, further comprising insertion bevels arranged on at least one of a long end of each guide rail of the filter insert and on the other ends of each guide rail on the housing side adjacent to the parting plane.

6. The filter arrangement according to claim 2, further comprising stop surfaces extending transversely to the axis, and counter-stops on the filter insert, wherein the stops force the filter insert into a desired position.

7. The filter arrangement according to claim 1, wherein the profile parts are at least one of webs and profile strips extending parallel to the parting plane.

8. The filter arrangement according to claim 7, wherein the at least one of the webs, the profile strips, and are arranged on the bottom discs.

9. The filter arrangement according to claim 7, wherein the profile strips have a profile including at least one of a T and double T-profile.

10. The filter arrangement according to claim 9, wherein a flange of the profile is distant a the respective bottom disc in the assembled state of the filter arrangement and is substantially completely enclosed by arranging profiles on the margins of the housing parts.

11. The filter arrangement according to claim 10, wherein the profile parts are webs and the profile is a double T-profile including a plurality of flanges, at least one of the webs is configured to be pushed in between the flanges of the double T-profile.

12. The filter arrangement according to claim 7, wherein the profile parts are webs and the profile includes a plurality of flanges, at least one of the webs is configured to be pushed in between a flange of the profile and at least one of transverse ribs and transverse webs are arranged on the bottom discs.

13. The filter arrangement according to claim 7, further comprising outside webs arranged on the bottom discs configured to bear against an inside of the side walls.

14. The filter arrangement according to claim 1, wherein each one of the bottom discs has a center region and a margin region surrounding the center region, and the center region has a plurality of ribs formed thereon, and the margin region is flat and sealingly connected to the side walls of the housing.

15. A filter arrangement, comprising:
a housing defining an interior region, and the housing has an inlet and an outlet; and
a filter insert defining an interior space;
wherein the filter insert is configured to pass air radially inward from the interior region of the housing to the interior space of the filter insert;
wherein the housing has a pair of sidewalls, and the filter insert has a pair of bottom discs that are uninterruptedly connected to the sidewalls in a form-fitting manner, such that the sidewalls and the discs are configured to stiffen one another and carry an engine load.

16. The filter arrangement according to claim 15, wherein the filter insert comprises:
a filter wall made of an arcuate strip of filter material;
a pair of bottom discs connected to one another through the filter wall; and
a lateral disc connected to the filter wall, so as to define the interior space within filter insert.

17. The filter arrangement according to claim 16, wherein the arcuate strip of filter material surrounds the interior space and has one of a U-shape, a C-shape and a G-shape.

18. The filter arrangement according to claim 15, wherein the filter wall is spaced apart from the housing so as to define the interior region between the housing and the filter insert.

19. The filter arrangement according to claim 15, wherein the bottom discs are parallel to one another.

20. The filter arrangement according to claim 19, wherein each one of the bottom discs has a center region and a margin region surrounding the center region, and the center region has a plurality of ribs formed thereon, and the margin region is flat and sealingly connected to the side walls of the housing.

* * * * *